Patented July 16, 1935

2,008,102

UNITED STATES PATENT OFFICE 2,008,102

RUBBER PLASTICIZER

Julius Hyman, Chicago, Ill., assignor to Velsicol Corporation, Chicago, Ill., a corporation of Illinois No Drawing. Application May 14, 1934, Serial No. 725,658

4 Claims. (Cl. 106—23)

This invention relates to the plasticizing of rubber and rubber-like masses, and more particularly to the use of certain polymerized petroleum derivatives in bringing about this result.

Innumerable industrial uses have been found for rubber and rubber-like masses, such as gutta-percha and polymerized chloroprene. In general, however, the crude and/or reclaimed rubber is mixed intimately with certain agents which accentuate certain desirable properties for the use the rubber is intended. Among such mixing agents are plasticizers, which may lend flexibility, tackiness, easier workability and/or other valuable characteristics to the rubber mixture.

I have found that an excellent plasticizer for rubber, rubber mixtures and rubber-like masses is a polymerized essentially hydrocarbon product arising from the high pressure polymerization of cracked gasolines, preferably in the presence of a contact mass, such as diatomaceous earth. When this polymerization is carried on at between 450° F. and 750° F., a polymerized product is obtained which mills readily with rubber to form an easily workable mass which is more or less tacky, depending on the ratio of rubber to polymer.

The polymerized product referred to may be obtained from the high pressure polymerization of cracked gasolines from so-called vapor phase processes, liquid phase processes or liquid-vapor phase processes. To explain briefly what is meant by high pressure polymerization, the following examples are given:

Gasoline or distillate containing a relatively large proportion of fractions of gasoline boiling range, after having been condensed, are passed into contact with a contact mass which may comprise diatomaceous earth, fuller's earth, clay, activated carbon or the like. The gasoline or distillate is heated to a temperature at which it would normally vaporize, and sufficient super atmospheric pressure is maintained on the gasoline or distillate during the polymerization step to prevent substantial vaporization. Thus, for instance, the temperature may range from 450° F. to 750° F., more or less, the pressure at these temperatures depending on the vapor pressure of the gasoline being treated at the selected temperature. The polymerization may be accomplished by passing the gasoline into contact with a stationary bed of the contact mass, or the contact material may be dispersed in the gasoline to be treated. A certain amount of polymerization will occur even in the absence of contact material at these temperatures, but the polymerization is notably increased in the presence of such contact materials as herein mentioned. The purpose of this polymerization treatment is to remove from the gasoline unsuitable compounds which might later act detrimentally on the finished motor fuel.

High pressure polymerization is well known in refinery practice and prior art patents and it is unnecessary to describe it in further detail for the purpose of this specification.

The polymerized product resulting from the pressure polymerization of vapor phase cracked gasoline is the preferred plasticizer since it has a relatively high plasticizing power due to its relatively high iodine number. In my research I have found that increase in plasticizing power is correlated broadly to the increase in iodine number of the pressure polymer of the present invention.

In its preparation, the polymer is generally separated from the unpolymerized gasoline by flashing or distillation. It may have a high iodine number, depending on the unsaturation of the original cracked gasoline. Despite this, however, the tendency of the polymers toward film formation through oxidation is low. The polymers are composed almost entirely of compounds which are viscous liquids at ordinary temperatures. One may by distillation vary the viscosity of the polymers from thin naphtha-like liquids (composed largely of gasoline) to heavy liquids which barely flow at ordinary room temperatures. The polymers in thin films are found to be reddish-yellow or brownish-yellow in color, somewhat like the color of retort pine tar. The body of reduced pressure polymers is also reminiscent of pine tar, and they are used similarly to pine tar in rubber compounding. Pressure polymers, however, are sensibly neutral bodies possessing characteristic petroleum odors and showing exceptional plasticizing powers. From $\frac{1}{10}\%$ to 25% polymers may be used in compounding, the percentages referring to the total solids content of the mix.

Pressure polymers such as herein described are distinguished from various types of petroleum tars, sludge oils, liquid asphalts and black fuel oils in that the polymers possess relatively high iodine numbers (between 100 and 200 by the Wijs method) and do not tend to blacken the mixtures in which they are incorporated. Pressure polymers such as herein described differ from other petroleum polymers and heavy petroleum oils in that they are composed almost entirely of compounds which are viscous, sticky liquids at ordinary room temperatures.

The viscosity of the viscous, sticky polymer referred to Saybolt Universal at 210° F. may vary from 50 seconds to 2,000 seconds. The non-volatile content of such viscous sticky polymers will vary from approximately 75% to 95% as measured by the standard A. S. T. M. method used for testing coating materials, such as varnish.

I claim as my invention:

1. A mixture comprising rubber or a rubber-like mass and a polymer derived from the high pressure liquid phase polymerization at temperatures between 450° and 750° F. of cracked gasolines.

2. A mixture comprising $\frac{1}{10}$% to 25% of a polymer derived from the high pressure liquid phase polymerization at temperatures between 450° and 750° F. of cracked gasolines, and rubber or a rubber-like mass.

3. A mixture comprising $\frac{1}{10}$% to 25% of a viscous, sticky liquid polymer of reddish-yellow or brownish-yellow color derived from the high pressure liquid phase polymerization at temperatures between 450° F., and 750°F. of cracked gasolines, and rubber or a rubber-like mass.

4. A mixture comprising $\frac{1}{10}$% to 25% of a viscous, sticky-liquid polymer having an iodine number between 100 and 200 derived from the high pressure liquid phase polymerization of cracked gasolines, and rubber or a rubber-like mass.

JULIUS HYMAN.